(12) United States Patent
Liou

(10) Patent No.: US 6,175,546 B1
(45) Date of Patent: Jan. 16, 2001

(54) CURVED-BEAM SUPPORTING STRUCTURE FOR OPTICAL PICKUP ACTUATORS IN OPTICAL DISC DRIVERS

(75) Inventor: Jiin-Song Liou, Miao-Li (TW)

(73) Assignee: Industrial Technology Research Institute, Hsinchu (TW)

( * ) Notice: Under 35 U.S.C. 154(b), the term of this patent shall be extended for 0 days.

(21) Appl. No.: 09/033,865

(22) Filed: Mar. 3, 1998

(30) Foreign Application Priority Data

Oct. 20, 1997 (TW) .............................................. 86217691

(51) Int. Cl.⁷ .................................................... G11B 17/00
(52) U.S. Cl. ............................................................. 369/244
(58) Field of Search ................................... 369/215, 219, 369/220, 244, 247

(56) References Cited

U.S. PATENT DOCUMENTS

| | | | |
|---|---|---|---|
| 5,761,183 | * 6/1998 | Ikegame | 369/220 |
| 5,933,405 | * 8/1999 | Song | 369/244 |
| 6,018,509 | * 1/2000 | Itoh et al. | 369/244 |

FOREIGN PATENT DOCUMENTS 6-162538 * 6/1994 (JP) .......................................... 369/244

* cited by examiner

Primary Examiner—Allen T. Cao
(74) Attorney, Agent, or Firm—Knobbe, Martens, Olson & Bear, LLP

(57) ABSTRACT

A curved-beam supporting structure for use on an optical pickup actuator is provided, which is capable of supporting both the focusing and tracking movements of the optical pickup actuator, allowing the actuator to move freely in both the focusing and tracking directions. The curved-beam supporting structure includes a voice-ring motor yoke for supporting the actuator; and at least four curved beams made of metal, all being mounted between the yoke and the lens holder of the actuator and oriented in perpendicular to both the tracking and focusing directions of the actuator. The curved design of the beams can reduce the rigidity of these beams in the radial direction of the actuator. Moreover, the curved-beam supporting structure can prevent the resonance that would otherwise caused by the electromagnetic reaction force exerted by the focusing and tracking coils against the yoke in the prior art. The actuator is thus more stable when operating in high-frequency regions.

20 Claims, 6 Drawing Sheets

CURVED-BEAM SUPPORTING STRUCTURE FOR OPTICAL PICKUP ACTUATORS IN OPTICAL DISC DRIVERS

BACKGROUND OF THE INVENTION

1. Field of the Invention

This invention relates to optical pickup (read/write head) for optical disc drives, and more particularly, to a curved-beam supporting structure for used on the objective-lens driving unit (actuator) of an optical pickup to support the focusing and tracking movements of the actuator.

2. Description of Related Art

Optical discs are a mass storage medium that can store a large amount of digital data thereon, which can be read by using optical disc drives. An optical disc drive is provided with an optical pickup (read/write head) for reading the data stored on an optical disc. During read operation, the optical pickup should be capable of focusing a laser beam precisely on the target track where the data to be read out are located. An objective lens is used for the focusing purpose. A driving unit (or called actuator) is used to move the objective lens in various directions during the focusing and tracking operations to bring the laser beam into focused and tracked condition. Defocusing and mistracking of the laser beam are usually caused by deviations and oscillations of the optical disc being read. The actuator should have the following features: (1) high sensitivity; (2) good dynamic characteristics, such as the capability to maintain stable operation in high-frequency regions; and (3) compact in size and low in manufacturing cost.

In the optical pickup, a supporting structure is used to support the actuator in such a manner that the actuator can freely move in both the focusing and tracking directions. A conventional type of supporting structure for the optical pickup actuator includes four parallel oriented straight beams to support the focusing and tracking movements of the optical pickup actuator, such as the one disclosed in the U.S. Pat. No. 4,842,392 "OBJECTIVE LENS DRIVING UNIT" to Nakamura. This patent discloses a parallel-beam supporting structure which is characterized in that the center of the driving force is coincident with the center of weight of the moving parts of the actuator. One drawback to the conventional parallel-beam supporting structure, however, is that it can cause the actuator to suffer from resonance that are caused by internal electromagnetic reaction forces. This drawback would cause the servo control for the focusing and tracking operations to be unstable.

SUMMARY OF THE INVENTION

It is therefore an objective of the present invention to provide a curved-beam supporting structure which is capable of supporting both the focusing and tracking movements of an optical pickup actuator used in an optical disc drive.

It is another objective of the present invention to provide a curved-beam supporting structure which can prevent the resonance that would otherwise be caused by the electromagnetic reaction force in the prior art when operating in the high-frequency regions.

In accordance with the foregoing and other objectives of the present invention, a new supporting structure is provided for supporting the focusing and tracking movements of an optical pickup actuator in an optical disc drive. The optical pickup has an objective lens supported by a lens holder. The supporting structure of the invention includes the following constituent parts: a voice-ring motor yoke for supporting the actuator; and at least four curved beams made of metal, including a first curved beam, a second curved beam, a third curved beam, and a fourth curved beam, all of which are mounted between the yoke and the lens holder and oriented in perpendicular to both the tracking and focusing directions of the actuator, the first and second curved beams being mounted on one side of the actuator and the third and fourth curved beams being mounted on the other side of the actuator, the first and third curved beams being arranged farther away from the yoke than the second and fourth curved beams. The curved design of the beams can reduce the rigidity of these beams in the radial direction of the actuator.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1A:
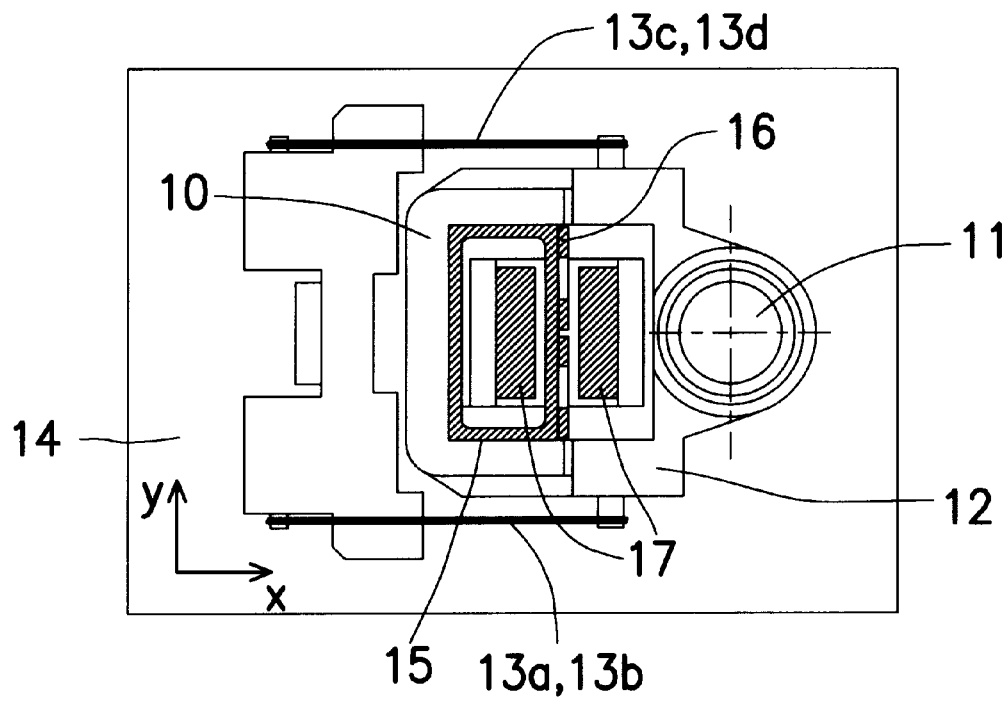
FIG. 1A shows a schematic top view of an optical pickup which utilizes the curved-beam supporting structure according to the invention.
Figure 1B:
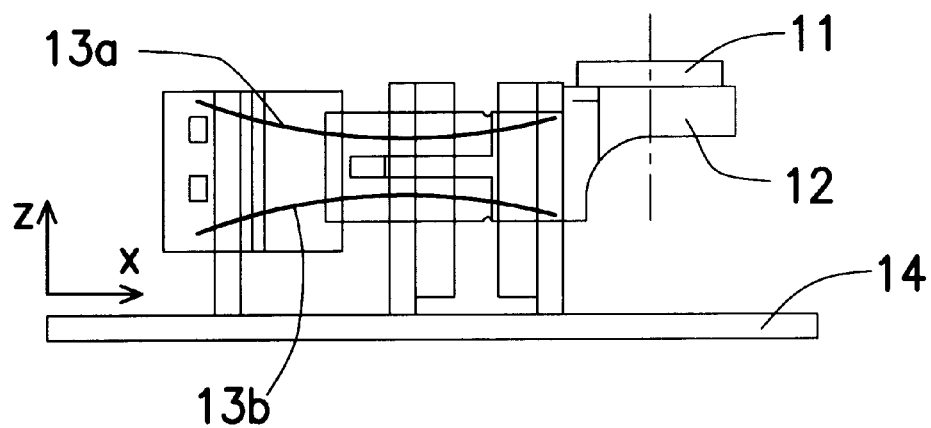
FIG. 1B shows a schematic side view of the optical pickup of FIG. 1A.

FIGS. 1A–1B are top and side views of an optical pickup which utilizes the curved-beam supporting structure according to the invention. This curved-beam supporting structure is characterized in the provision of at least four curved metal beams, as respectively designated by the reference numerals 13a, 13b, 13c, 13d (only 13a, 13c are visible in the top view of FIG. 1A, and only 13a, 13b are visible in the side view of FIG. 1B). These four curved beams 13a, 13b, 13c, 13d in combination constitute a suspension system that allows an optical pickup actuator 10 to move freely in the focusing and tracking directions during the focusing and tracking operations. The optical pickup includes an objective lens 11, a lens holder 12 on which the objective lens 11 is mounted, a voice-ring motor yoke 14 for supporting the entire actuator 10, a focusing coil 15, a tracking coil 16, and a permanent magnet 17. The four curved beams 13a, 13b, 13c, 13d are connected between the lens holder 12 and the yoke 14. The focusing coil 15, the tracking coil 16, and the magnet 17 are constituent parts of the actuator 10. The focusing coil 15 can be excited to produce a magnetic field that interacts with the magnet 17 to thereby move the actuator 10 in the Z-direction (FIG. 1B) until the laser beam (not shown) is in focused condition; while the tracking coil 16 can be excited to produce a magnetic field that interacts with the magnet 17 to thereby move the actuator 10 in the Y-direction (FIG. 1A) until the laser beam is spotted on the target track on the optical disc (not shown) where the data to be read out are located.

In both the focusing and tracking operations, the four curved beams 13a, 13b, 13c, 13d allow the actuator 10 to move freely in both the Z-direction (i.e., the focusing direction) and the Y-direction (i.e., the tracking direction). Moreover, since the four curved beams 13a, 13b, 13c, 13d are all made of metal, they can also be used to conduct excitation currents to the focusing coil 15 and tracking coil 16.

The above-mentioned curved-beam supporting structure of the invention can allow the actuator 10 to move freely in two directions during the focusing and tracking operations of the optical pickup. The invention differs from the prior art particularly in that the four beams here are curved in such a manner as to reduce the rigidity in the radial direction (i.e., the X-direction), thereby reducing the resonant frequencies in pitching ($\theta_Y$) and yawing ($\theta_Z$) of the actuator 10. When the resonant frequencies in $\theta_Y$ and $\theta_Z$ are effectively reduced, the resonant frequencies of the actuator 10 in (X, Y, Z, $\theta_X$, $\theta_Y$, $\theta_Z$) can be set apart from the resonant frequency of the mechanical structure of the voice-ring motor, thereby preventing the resonance that would otherwise caused by the electromagnetic reaction force exerted by the focusing coil 15 and tracking coil 16 against the yoke 14.

Fundamentally, there are no limitations to the radius of curvature of the curved beams 13a, 13b, 13c, 13d. These curved beams 13a, 13b, 13c, 13d are so shaped as to reduce the rigidity thereof in the radial direction (i.e., the X-direction). The curvature and placement of the four curved beams 13a, 13b, 13c, 13d can be variously modified by the designers in accordance with actual requirements.

Figure 3A:
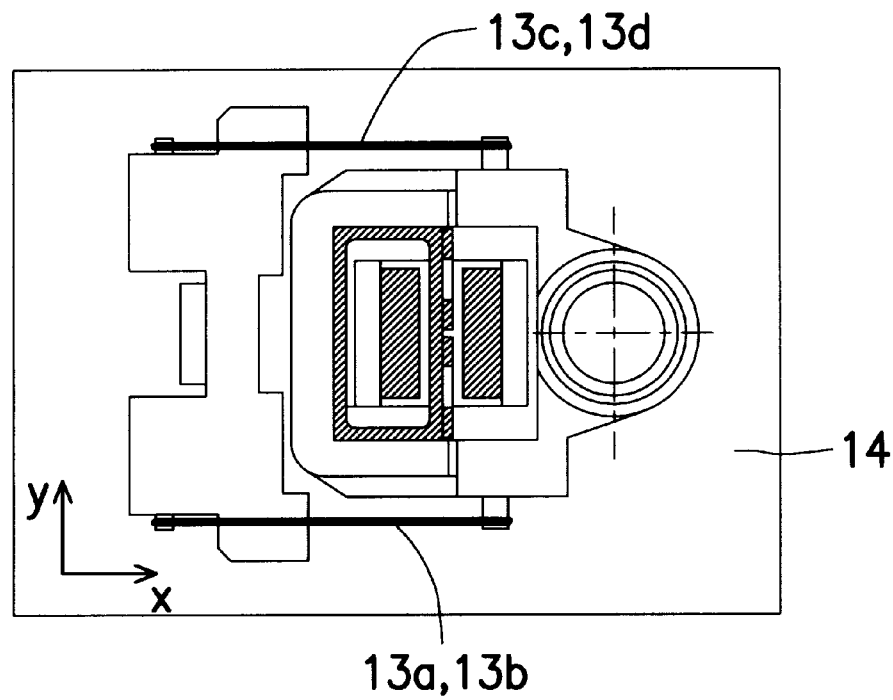
FIG. 3A shows a schematic top view of a second preferred embodiment of the curved-beam supporting structure of the invention.
Figure 3B:
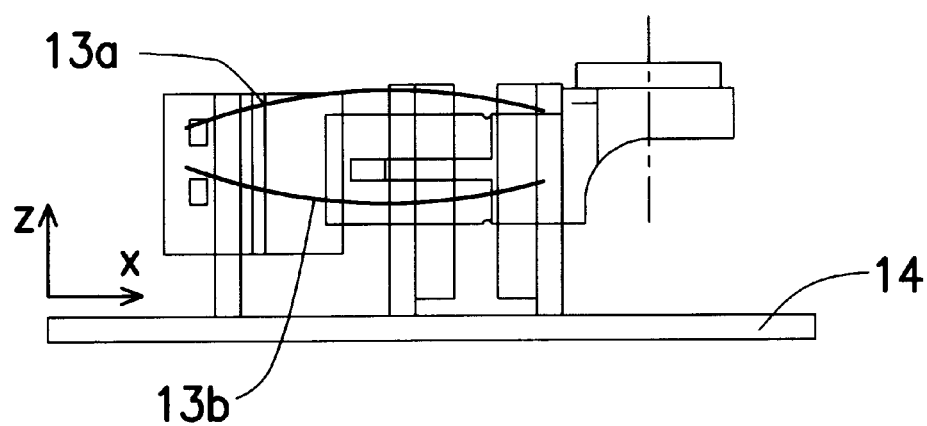
FIG. 3B shows a schematic side view of the curved-beam supporting structure of FIG. 3A.
Figure 4A:
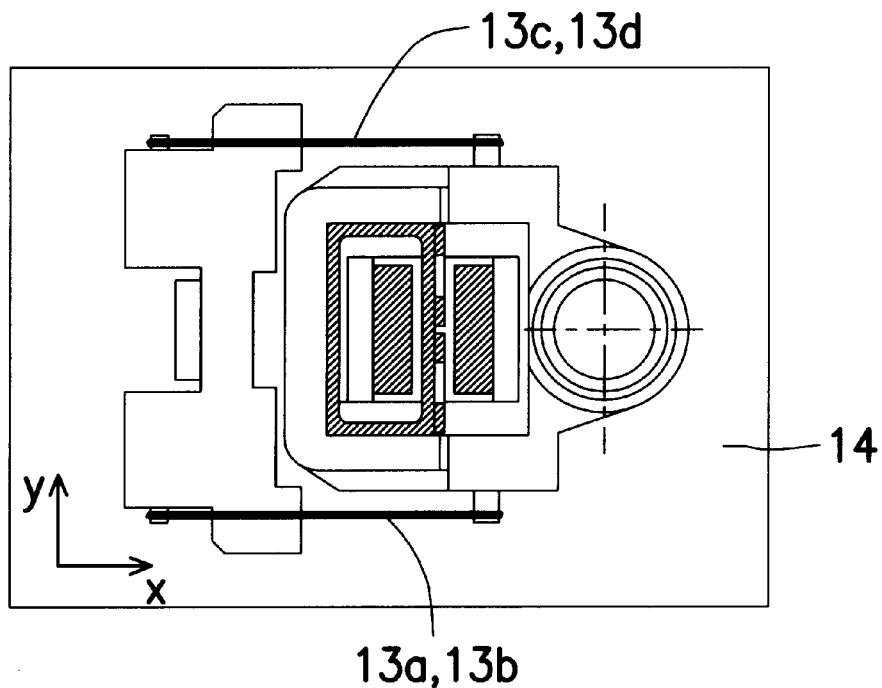
FIG. 4A shows a schematic top view of a third preferred embodiment of the curved-beam supporting structure of the invention.
Figure 4B:
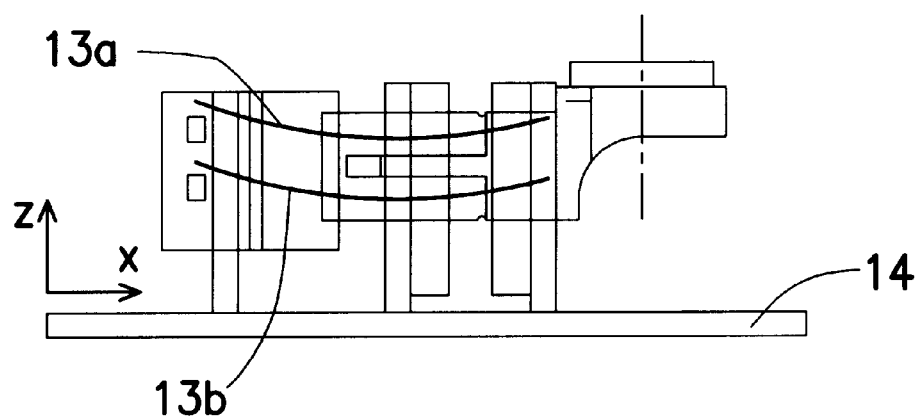
FIG. 4B shows a schematic side view of the curved-beam supporting structure of FIG. 4A.
Figure 5A:
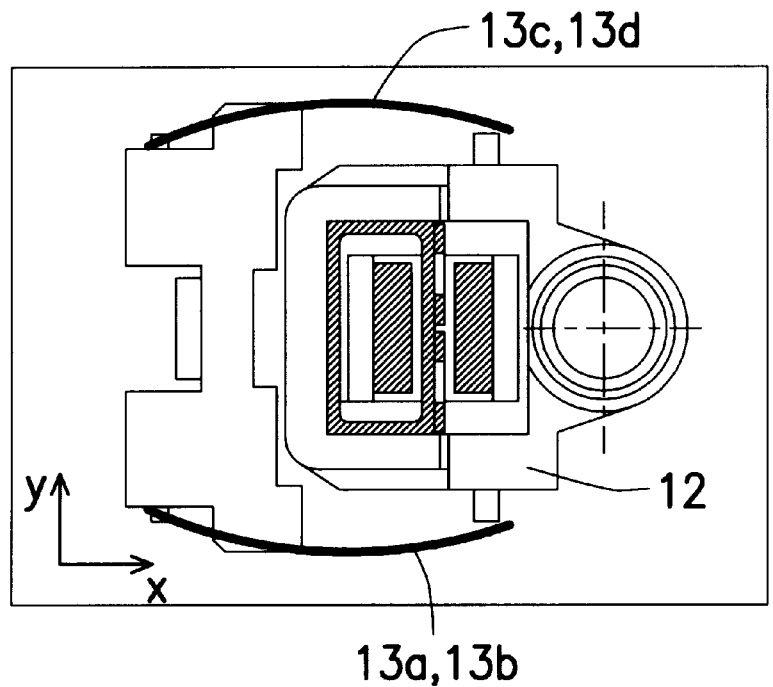
FIG. 5A shows a schematic top view of a fourth preferred embodiment of the curved-beam supporting structure of the invention.
Figure 5B:
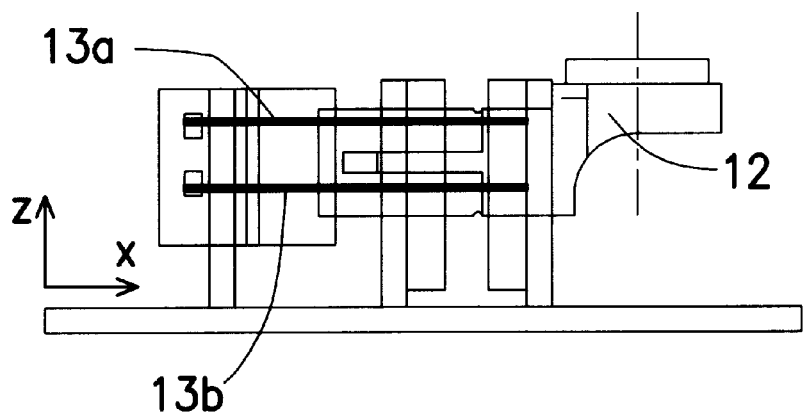
FIG. 5B shows a schematic side view of the curved-beam supporting structure of FIG. 5A.

Five variations for the four curved beams 13a, 13b, 13c, 13d are possible, as respectively disclosed in the following with reference to FIGS. 2A–2B; FIGS. 3A–3B; FIGS. 4A–4B; FIGS. 5A–5B; and FIGS. 6A–6B. In these drawings, identical constituent parts are labeled with the same reference numerals.

Figure 2A:
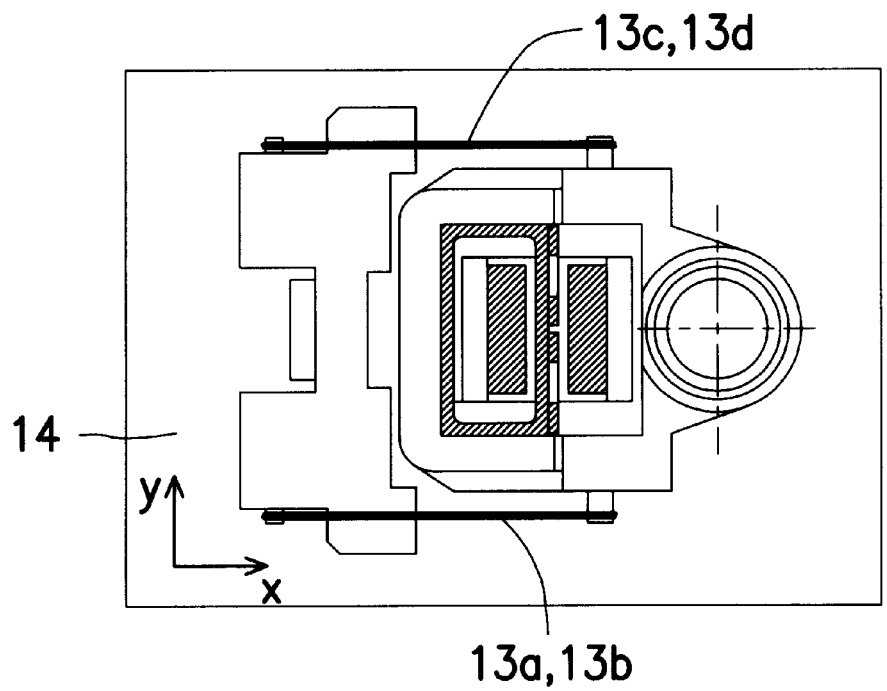
FIG. 2A shows a schematic top view of a first preferred embodiment of the curved-beam supporting structure of the invention.
Figure 2B:
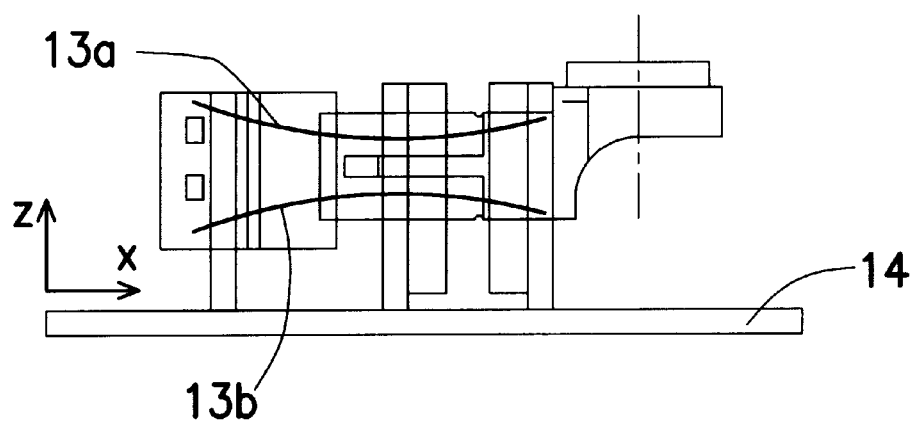
FIG. 2B shows a schematic side view of the curved-beam supporting structure of FIG. 2A.

Referring to FIGS. 2A–2B, in the first preferred embodiment of the invention, the four curved beams 13a, 13b, 13c, 13d are substantially oriented in the X-direction (i.e., the radial direction) and in perpendicular to both the Y-direction (i.e., the tracking direction) and the Z-direction (i.e., the focusing direction). The two curved beams 13a, 13b on one side of the actuator 10 are provided in a symmetric manner with respect to the other two curved beams 13c, 13d provided on the other side. In particular, as shown in the side view of FIG. 2B, the curved beam 13a, which is farther away from the yoke 14 than the curved beam 13b, is curved in such a manner that the convex side thereof faces the yoke 14; while the curved beam 13b is curved in such a manner that the concave side thereof faces the yoke 14.

Referring to FIGS. 3A–3B, in the second preferred embodiment of the invention, the four curved beams 13a, 13b, 13c, 13d are substantially oriented in the X-direction (i.e., the radial direction) and in perpendicular to both the Y-direction (i.e., the tracking direction) and the Z-direction (i.e., the focusing direction). The two curved beams 13a, 13b on one side of the actuator 10 are provided in a symmetric manner with respect to the other two curved beams 13c, 13d provided on the other side. In particular, as shown in the side view of FIG. 3B, the curved beam 13a, which is farther away from the yoke 14 than the curved beam 13b, is curved in such a manner that the concave side thereof faces the yoke 14; while the curved beam 13b is curved in such a manner that the convex side thereof faces the yoke 14.

Referring to FIGS. 4A–4B, in the third preferred embodiment of the invention, the four curved beams 13a, 13b, 13c, 13d are substantially oriented in the X-direction (i.e., the radial direction) and in perpendicular to both the Y-direction (i.e., the tracking direction) and the Z-direction (i.e., the focusing direction). The two curved beams 13a, 13b on one side of the actuator 10 are provided in a symmetric manner with respect to the other two curved beams 13c, 13d provided on the other side. In particular, as shown in the side view of FIG. 4B, the curved beams 13a, 13b are each curved in such a manner that the convex side thereof faces the yoke 14.

Referring to FIGS. 5A–5B, in the fourth preferred embodiment of the invention, the four curved beams 13a, 13b, 13c, 13d are substantially oriented in the X-direction (i.e., the radial direction) and in perpendicular to both the Y-direction (i.e., the tracking direction) and the Z-direction (i.e., the focusing direction). The two curved beams 13a, 13b on one side of the actuator 10 are provided in a symmetric manner with respect to the other two curved beams 13c, 13d provided on the other side. In particular, as shown in the top view of FIG. 5A, the four curved beams 13a, 13b, 13c, 13d are all curved in such a manner that the concave side thereof faces the lens holder 12.

Figure 6A:
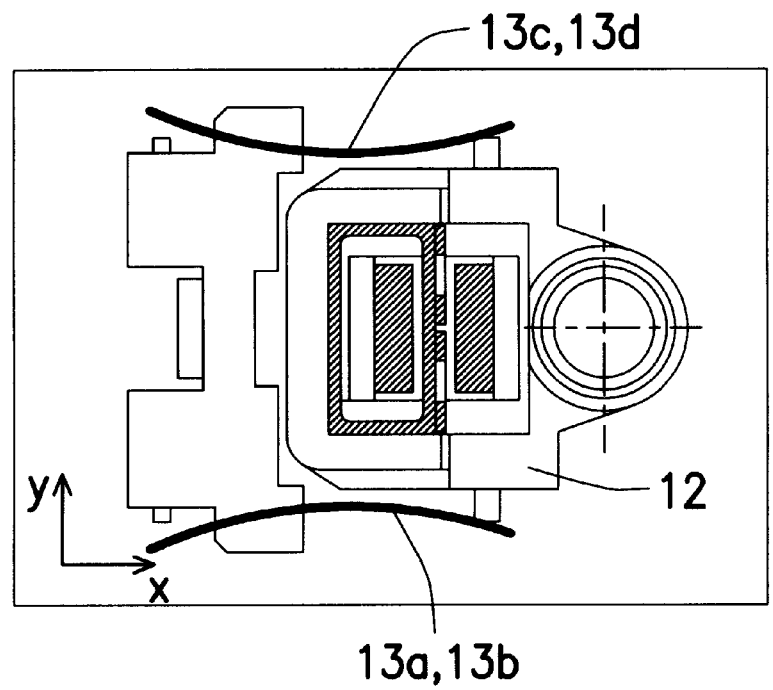
FIG. 6A shows a schematic top view of a fifth preferred embodiment of the curved-beam supporting structure of the invention.
Figure 6B:
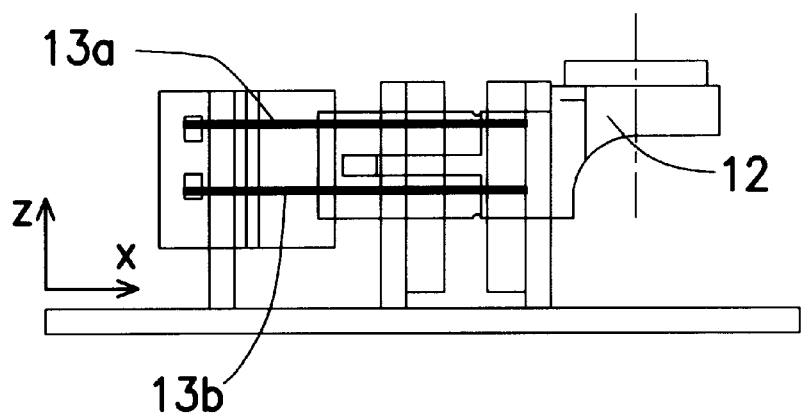
FIG. 6B shows a schematic side view of the curved-beam supporting structure of FIG. 6A.

Referring to FIGS. 6A–6B, in the fifth preferred embodiment of the invention, the four curved beams 13a, 13b, 13c, 13d are substantially oriented in the X-direction (i.e., the radial direction) and in perpendicular to both the Y-direction (i.e., the tracking direction) and the Z-direction (i.e., the focusing direction). The two curved beams 13a, 13b on one side of the actuator 10 are provided in a symmetric manner with respect to the other two curved beams 13c, 13d provided on the other side. In particular, as shown in the top view of FIG. 6A, the four curved beams 13a, 13b, 13c, 13d are all curved in such a manner that the convex side thereof faces the lens holder 12.

In conclusion, the invention has the following three advantages. First, the curved-beam supporting structure of the invention allows the optical pickup actuator to be freely movable in both the focusing and tracking directions. Second, the curved design of the beams allows a reduction in the resonant frequencies in pitching and yawing of the optical pickup actuator, and also can prevent the resonance that would otherwise caused by the electromagnetic reaction force exerted by the focusing and tracking coils against the yoke in the prior art. Third, the invention differs from the prior art only in that the beams here are curved; therefore, the invention can be easily implemented without having to modify the mechanical structure of the optical pickup actuator.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A curved beam supporting structure for use to support the focusing and tracking movements of an optical pickup actuator having an objective lens supported by a lens holder, said curved-beam supporting structure comprising:

a voice-ring motor yoke for supporting said actuator; and at least four curved beams made of metal, including a first curved beam, a second curved beam, a third curved beam and a fourth curved beam, all of which are mounted between said yoke and said lens holder and oriented in perpendicular to both the tracking and focusing directions of said actuator wherein each of the four curved beams are curved over substantially their entire length so as to define an arc, said first and second curved beams being mounted on one side of said actuator and said third and fourth curved beams being mounted on the other side of said actuator, said first and third curved beams being arranged farther away from said yoke than said second and fourth curved beams.

2. The curved-beam supporting structure of claim 1, wherein said actuator comprises:

a focusing coil, excited by a first excitation current, for producing a first electromagnetic force used to move said actuator to perform a focusing action; and a tracking coil, excited by a second excitation current, for producing a second electromagnetic force used to move said actuator to perform a tracking action.

3. The curved-beam supporting structure of claim 2, wherein said first and second excitation currents are conducted via said curved beams respectively into said focusing coil and said tracking coil.

4. The curved-beam supporting structure of claim 1, wherein said first and third curved beams are shaped in such a manner that the convex side thereof faces said yoke; and said second and fourth curved beams are shaped in such a manner that the concave side thereof faces said yoke.

5. The curved-beam supporting structure of claim 1, wherein said first and third curved beams are shaped in such a manner that the concave side thereof faces said yoke; and said second and fourth curved beams are shaped in such a manner that the convex side thereof faces said yoke.

6. The curved-beam supporting structure of claim 1, wherein said first, second, third, and fourth curved beams are all shaped in such a manner that the convex side thereof faces said yoke.

7. The curved-beam supporting structure of claim 1, wherein said first, second, third, and fourth curved beams are all shaped in such a manner that the concave side thereof faces said lens holder.

8. The curved-beam supporting structure of claim 1, wherein said first, second, third, and fourth curved beams are all shaped in such a manner that the convex side thereof faces said lens holder.

9. The curved beam supporting structure of claim 1, wherein the curves in the beams have a constant radius of curvature.

10. The curved beam supporting structure of claim 1, wherein the curves in the beams have a rigidity along the length of each beam and the beams are curved to reduce the rigidity along the length of each beam.

11. The curved beam supporting structure of claim 1, wherein each of the beams has one end connected to the yoke and an opposing end connected to the lens holder, with each beam being in the same plane as its connected ends.

12. The curved beam supporting structure of claim 1, wherein each of the beams has one end connected to the yoke and an opposing end connected to the lens holder, with each beam being in the same plane as its connected ends and with each plane being parallel to an optical axis of the optical pickup.

13. The curved beam supporting structure of claim 1, wherein each of the beams has one end connected to the yoke and an opposing end connected to the lens holder, with each beam being in the same plane as its connected ends, and wherein the first and second beams are in a first plane and the second and third beams are in a second plane parallel to the first plane.

14. The curved beam supporting structure of claim 1, wherein each of the beams has one end connected to the yoke and an opposing end connected to the lens holder, with each beam being in the same plane as its connected ends with the first and third beams being in a common plane.

15. The curved beam supporting structure of claim 3, wherein the curves in the beams have a constant radius of curvature.

16. The curved beam supporting structure of claim 3, wherein the curves in the beams have a rigidity along the length of each beam and the are curved to reduce the rigidity along the length of each beam.

17. The curved beam supporting structure of claim 3, wherein each of the beams has one end connected to the yoke and an opposing end connected to the lens holder, with each beam being in the same plane as its connected ends.

18. The curved beam supporting structure of claim 3, wherein each of the beams has one end connected to the yoke and an opposing end connected to the lens holder, with each beam being in the same plane as its connected ends and with each plane being parallel to an optical axis of the optical pickup.

19. The curved beam supporting structure of claim 3, wherein each of the beams has one end connected to the yoke and an opposing end connected to the lens holder, with each beam being in the same plane as its connected ends, and wherein the first and second beams are in a first plane and the second and third beams are in a second plane parallel to the first plane.

20. The curved beam supporting structure of claim 3, wherein each of the beams has one end connected to the yoke and an opposing end connected to the lens holder, with each beam being in the same plane as its connected ends and with the first and third beams being in a common plane.

* * * * *